United States Patent
Goto et al.

[15] 3,655,396
[45] Apr. 11, 1972

[54] PROCESS FOR PREPARING PULVERIZED FEED FOR ANIMALS

[72] Inventors: Yasuo Goto, Chita-gun, Aichi; Akio Taki, Handa-shi, Aichi, both of Japan

[73] Assignee: Nihon Shokuhin Kako Co., Ltd., Tokyo, Japan

[22] Filed: May 6, 1969

[21] Appl. No.: 822,188

[30] Foreign Application Priority Data

May 14, 1968 Japan....................................43/31916

[52] U.S. Cl................................................99/9, 99/2, 195/30
[51] Int. Cl.........................................A23k 1/00, C12b 1/00
[58] Field of Search...........424/93; 260/412.2, 412.3, 412.4; 195/48, 2, 4, 7, 30, 31; 99/2, 2 AB, 22, 8, 9, 96, 97, 30, 48

[56] References Cited

UNITED STATES PATENTS

| | | | |
|---|---|---|---|
| 1,434,462 | 11/1922 | Wagner | 99/96 |
| 2,474,046 | 6/1949 | Fries | 195/48 |
| 2,568,360 | 9/1951 | Parsons | 195/48 |
| 3,429,777 | 2/1969 | Bode | 99/2 |

*Primary Examiner*—Norman Yudkoff
*Assistant Examiner*—Hiram H. Bernstein
*Attorney*—McGlew and Toren

[57] ABSTRACT

A process for preparing pulverized feed for animals which comprises inoculating light steep liquor of corn with non-pathogenic microorganisms (yeasts, molds and bacteria) having the property of metabolizing lactic acid under aerobic conditions to culture said microorganisms, and concentrating and drying the resulting cultured broth wherein the amount of the lactic acid is reduced, to obtain the pulverized feed therefrom.

10 Claims, 1 Drawing Figure

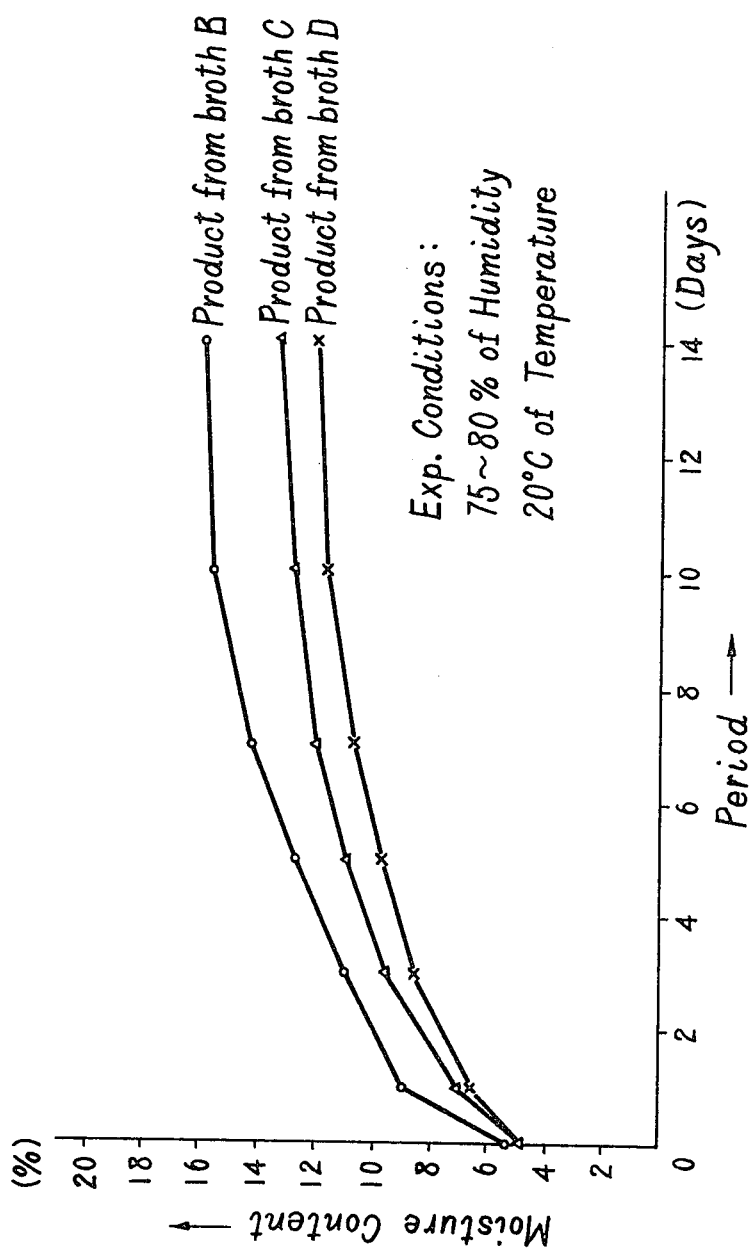

PROCESS FOR PREPARING PULVERIZED FEED FOR ANIMALS

The present invention relates to a process for preparing pulverized feed and more particularly to a process for preparing pulverized feed for animals, which comprises culturing defined microorganisms in light steep liquor of corn and concentrating and drying the resulting cultured broth.

In the opening step of the process producing cornstarch, the corn grain is steeped in 0.2 – 0.5 percent aqueous sulfurous acid for 40 – 50 hours and subsequently the liquor is separated. This steep mother liquor, namely, so-called "light steep liquor," contains about 10 percent of solid substances which consist of water-soluble proteins, peptides, amino acids, inorganic substances, saccharides, various vitamins, and further a significant amount of lactic acid formed by lactic acid fermentation occurring during the above corn-steeping step. The composition of said solid substances is as follows:

| | |
|---|---|
| Nitrogen estimated by Kjeldahl-method | 7–8 % |
| Crude ash | 15–20 % |
| Direct reducing sugar | 5–8 % |
| Lactic acid | 20–25 % |

The distribution of the above nitrogen found in the light steep liquor is as follows:

| | |
|---|---|
| Protein nitrogen | 12 % |
| Amino nitrogen | 35 % |
| Ammoniac nitrogen | 12 % |
| Amide nitrogen | 3 % |
| Peptide nitrogen 38 | 38 % |

The light steep liquor contains vitamins and unknown growth-promoting factors besides the above-mentioned nutritive substances, and accordingly, a concentrated viscous liquor made from the light steep liquor, namely, so-called "corn steep liquor," is used effectively in nutritive sources in animal feeds and supplements for fermentation media.

However, it is a disadvantage of the corn steep liquor that it is inconvenient to handle because of its liquid state, and especially that it is incapable of being mixed in large amount with the pulverized compound feeds because of its large water-content. Solidifying and pulverizing of corn steep liquor have already been attempted in order to overcome these disadvantages; however, it is extremely difficult to dehydrate and dry the corn steep liquor as it is. For instance, in attempting such a drying of the corn steep liquor by spray-drying under conditions in which the air temperature at the inlet of the drier is 150° C., and the air temperature at the outlet is 80° C., the finely sprayed liquor in the drier though having been dried, will absorb moisture instantly during the short time while being transported to the cyclone connected with the outlet of the drier and adheres to the inside wall of the drier thereby returning to pasty state.

Consequently, a few processes have also been proposed to prepare a pulverized substance from corn steep liquor, namely one process which consists of mixing fibrous substances with corn steep liquor so as to cause absorption of the corn steep liquor in the fibers and thereafter drying the resulting mixture; another known process consists of adding an inorganic substance, e.g., aluminum chloride or calcium chloride, to the corn steep liquor, in order to coagulate and separate the solid substances of the liquor, and thereafter drying the separated substances. However, these processes have still had shortcomings, namely that the nutritive value of the pulverized substances obtained is lower, and further that the hygroscopic property of the pulverized substances prepared has not yet been sufficiently improved, while the amount of the additives is increased closely to that contained in the solid substances of the corn steep liquor used.

It is, therefore, an object of the invention to use corn steep liquor as raw material for the compounding of feeds as a pulverized product which can easily be handled and is free of the shortcomings of known products.

It is another object of the invention to prepare a pulverized product of corn steep liquor for compounding of feeds having higher nutritive value.

It is a further object of the invention to prepare a pulverized product for compounding of feeds which is less hygroscopic.

The nature of the invention will be better understood from the following specification taken with the accompanying drawing.

The drawing is a graph showing a relation between days, for which the pulverized product is allowed to stand, and moisture-content of the pulverized product prepared according to the process.

It has been found that the difficulties in drying and pulverizing of the corn steep liquor as described above are mainly due to its large contents of lactic acid, and we have studied methods to remove such lactic acid from the corn steep liquor. As a result, we have been able to make a pulverized product from the light steep liquor, which is the preceding stage of the corn steep liquor, by means of culturing in the light steep liquor microorganisms capable of metabolizing lactic acid and thereafter concentrating and drying the resulting cultured broth of the microorganisms.

The corn steep liquor, as described before, contains many nutritive substances and has been used as an excellent nitrogen source in various microbial industries. In the present process, the light steep liquor having the same effectiveness as described above with reference to corn steep liquor, is used as culture medium for microorganisms. That is, light steep liquor is inoculated with non-pathogenic microorganisms having a metabolizing property for lactic acid under aerobic conditions and the microorganisms are cultured so as to assimilate or decompose the lactic acid contained in the media, thus eliminating the major hygroscopic substance in the corn steep liquor.

As the above microorganisms capable of metabolizing lactic acid, we name for instance, yeasts belonging to the Genus Endomycopsis, Hansenula, Saccharomyces, Candida, Mycotorula, Torulopsis, Mycoderma, etc., molds belonging to the Genus Aspergillus, Penicillium, Rhizopus, Mucor, etc., and bacteria belonging to the Genus Escherichia, Aerobacter, Bacillus, Pseudomonas, Sarcina, Acetobacter, etc. It is possible to use not only a single species of these microorganisms but several species simultaneously.

According to the process of the invention, the concentration of the solid substances in the light steep liquor is preferably adjusted to about 5 – 10 percent, and the liquor as it is, or after being subjected to the PH, but without supplementing any other nutritive substances, is inoculated with said microorganisms and the organisms are cultured under aeration and agitation. The culturing period of the microorganisms is the time required for metabolizing the hygroscopic constituents by the microorganisms, and it is generally standardized by the period when the remaining amount of the lactic acid in the cultured broth is reduced to less than one-fourth of the initial amount in the media. It is preferable that the remaining amount of lactic acid is reduced to a value as small as possible, for instance, by reducing said amount to less than about one-fifth of the initial amount, the hygroscopic property of the pulverized product prepared is markedly reduced. In the above microbial-culturing step, the light steep corn liquor media can be used in sterilized or unsterilized state. In case of using an unsterilized medium, the lactic acid-fermentation bacterium existing originally in the light steep liquor is made to co-exist with the microorganisms inoculated particularly as described above, in the culturing media, however, said lactic acid-fermentation bacterium can hardly propagate under the aerobic condition and at the culturing temperatures of the inoculated microorganisms.

It is not necessary to carry out the culturing step of the microorganisms used in the process in a sealed fermenter, but it may be carried out in an open fermenter. Furthermore, various types of continuous cultivation can be employed in the commercial operations of the above culturing step according to the present invention.

Table 1 shows remaining amounts of lactic acid and reducing sugar, respectively, in the cultured broth of Saccharomyces cerevisiae cultured under the conditions of shaking at 30° C.; and the Drawing shows the increase of the moisture content with the lapse of time, in the pulverized product prepared of each of the cultured broth A – D in said Table 1.

TABLE 1

|  | A | B | C | D |
|---|---|---|---|---|
| Culturing period (hours) | 0 | 16 | 20 | 24 |
| Lactic acid (% in solid substances) | 22.30 | 11.04 | 5.02 | 2.46 |
| Reducing sugar (% in solid substances) | 5.00 | 2.96 | 1.65 | 1.40 |

(Broth A could not be dried.)

According to the process of the invention, the cultured broth of the microorganisms obtained as described above, is preferably concentrated, as it is, in vacuo to a liquid containing about 30 – 60 percent of solid substances, or the filtrate of said cultured broth, from which the multiplied cells of microorganisms are once removed, is similarly concentrated in vacuo to a liquid containing about 30 – 60 percent of solid substances and thereafter mixed again with the previously-removed cells of microorganisms. The concentrated liquor containing or remixed with these cells is then dried and pulverized easily to a state where the moisture content is preferably reduced to less than 10 percent, by applying known processes such as spray drying, drum drying or flash drying.

The pulverized product prepared according to the process of the invention is less hygroscopic and its handling is extremely convenient. This pulverized product contains the remaining amounts of the constituents of the light corn steep liquor, together with the multiplied cells of microorganisms used, that is, proteins containing essential amino acids, vitamins, inorganic substances and unknown growth-promoting factors, and therefore that product is considerably reinforced and of higher value. Examples of the composition of essential amino acids and vitamins contained in the product are shown in Tables 2 and 3 compared with those of the solid substances of the corn steep liquor.

TABLE 2

| Essential amino acids | Product of the invention | Corn steep liquor (anhydrous) |
|---|---|---|
| Lysine | 2.8 % | 21 % |
| Threonine | 2.5 % | 1.9 % |
| Valine | 2.4 % | 1.9 % |
| Methionine | 1.7 % | 0.9 % |
| Isoleucine | 1.4 % | 1.1 % |
| Leucine | 3.2 % | 2.6 % |
| Phenylalanine | 1.6 % | 1.2 % |
| Tryptophan | 0.8 % | 0.1 % |

TABLE 3

| Vitamins | Product of the invention | Corn steep liquor (anhydrous) |
|---|---|---|
| Vitamin $B_1$ | 0.7 mg % | 0.5 mg % |
| Vitamin $B_2$ | 2.1 mg % | 1.0 mg % |
| Vitamin $B_6$ | 3.1 mg % | 1.5 mg % |
| Vitamin E | 1.9 mg % | – |
| Niacin | 19 mg % | 15.4 mg % |
| Pantothenic acid | 14 mg % | 2.6 mg % |
| Folic acid | 0.3 mg % | 0.2 mg % |
| Ergosterol | 1.1 mg % | – |
| Biotin | 6.7 γ | 8.8 γ |
| Choline | 0.37 % | 0.12 % |
| Inositol | 1.7 % | 1.3 % |

The details of the invention will be illustrated by the following examples, however, the description in these examples are not to be considered as limitations, since many changes in the details may be made without departing from the spirit of the invention. All percentages are by weight.

EXAMPLE 1

One kg. of corn grain is steeped in 2.5 liters of 0.5 percent aqueous sulfurous acid and the solution was kept at 50° C. for 48 hours while stirring. The corn grain absorbed water and swelled, and the soluble constituents were leached out and thereby lactic acid fermentation was caused to take place in the solution. Light steep liquor obtained by separating the corn grain contained 10 percent of solid substances, 100 g. of which contained 21 g. of lactic acid and 5.5 g. of reducing sugar. Each 100 ml. of the liquor were put into a 500 ml.-shaking flask, sterilized at 115° C. for 15 minutes, thereafter inoculated with a little amount of cells of Candida utilis previously prepared, and the microorganism were cultured at 30° C. for 20 hours while shaking. Having risen to 4.5 during the culturing, the PH was adjusted at this value thereafter. One liter of the cultured broth was collected and concentrated in vacuo to 220 ml. This concentrated liquor was dried by a drum drier having 50 cm. of diameter, 6 r.p.m. of rotational speed and 3 kg./cm.$^2$ of steam pressure. Thereby, 86 g. of a pulverized product containing 5.0 percent of moisture, 1.2 percent of lactic acid, 0.3 percent of reducing sugar, 59 percent of crude protein and 18.4 percent of ash, were prepared.

The pulverized product was less hygroscopic and even by allowing it to stand at 75 percent of humidity and a temperature of 20° C., the moisture content of the pulverized product amounted to 7.5 percent on the 4th day, to 9.3 percent on the 8th day, to 10.6 percent on the 14th day; and it showed thereafter it showed no more marked increase of the moisture content, but a favorable powdery condition was maintained.

A breeding test on chicks was carried out by using the above pulverized product as a constituent of feed under the following procedures:

Chicks tested: 2 groups consisting of 50 Broiler-type chicks (Dekalb Hybrid) each, having 38 g. of average weight, breeding was conducted in a battery.
Test period: Up to four weeks of age.
Composition of feeds: As shown in Table 4.

TABLE 4

|  | Control group | Test group |
|---|---|---|
| Starter diet for Broiler chicks | 70 % | 70 % |
| Soybean cake | 20 % | – |
| Pulverized product obtained in this example | – | 14.4 % |
| Corn | 10 % | 15.6 % |
| Crude Protein | 25.2 % | 25.1 % |

The protein contents of the above-mentioned ingredients of the feed are as follows:

Protein Content

| Starter diet for Broiler chicks | 22 % |
|---|---|
| Pulverized product obtained in this example | 59 % |
| Soybean cake | 44.8 % |
| Corn | 8.2 % |

Results:

As shown in Table 5, wherein the weight and the weight increase of the birds show average values, and the rate of feed demand shows the ratio of feed intake to weight increase.

TABLE 5

| Age of the birds in weeks | 1 | 2 | 3 | 4 | 1~4 |
| --- | --- | --- | --- | --- | --- |
| Control group: | | | | | |
| Weight | 83±2 | 164±12 | 261±12 | 391±3 | |
| Weight increase | 46±2 | 81±8 | 99±2 | 129±8 | 355 |
| Rate of feed demand | 1.41±0.02 | 1.50±0.00 | 1.89±0.04 | 1.90±0.07 | 1.74 |
| Test group: | | | | | |
| Weight | 91±4 | 186±7 | 310±8 | 439±12 | |
| Weight increase | 53±4 | 95±3 | 124±1 | 130±5 | 402 |
| Rate of feed demand | 1.41±0.09 | 1.43±0.08 | 1.68±0.02 | 2.13±0.14 | 1.72 |

Further, a breeding test on eels was carried out by using the pulverized product under the following procedures:

Eels tested:
20 kg. total weight of young eels, weighing about 25 g. each, were placed in a netted cage and steeped in a breeding pond having a temperature of 19° – 24° C.

Test period: 45 days

Composition of feeds:
A mixture of 100 parts of marketed feed for eels and 5 parts of oil was used for the control group; and a mixture of 85 parts of the same marked feed, 15 parts of the present pulverized product and 5 parts of oil was used for the test group.

Results:
As shown in Table 6, wherein the feed efficiency shows a ratio of weight increase to amount of feed supplied.

TABLE 6

|  | Control group | Test group |
| --- | --- | --- |
| Weight at the start | 20.0 kg. | 20.0 kg. |
| Weight at the end | 27.4 kg. | 30.7 kg. |
| Weight increase | 7.4 kg. | 10.7 kg. |
| Amount of feed supplied | 24.68 kg. | 24.68 kg. |
| Feed efficiency | 0.299 | 0.433 |

The results of above-mentioned breeding tests indicate that the pulverized product obtained by the invention has significant effects for breeding chicks and eels.

EXAMPLE 2

Ten liters of light steep liquor containing 5 percent of solid substances (100 g. of which contained 23 g. of lactic acid and 5.7 g. of reducing sugar), were placed in a Jar fermenter and sterilized. The steep liquor was inoculated with 200 ml. of seed-culture of Escherichia coli and the bacterium was cultured at 37° C. under conditions of aeration and agitation for 18 hours while the PH of the culturing medium was adjusted to about 7. The cultured broth so obtained was concentrated in vacuo to about 1.2 liters and the concentrate was dried by a spray drier wherein temperature of the charged air at the inlet was kept at 160° C. and that of the discharged air at the outlet at 80° C. In this manner, 430 g. of pulverized product containing 4.3 percent of moisture, 3.1 percent of lactic acid, 0.8 percent of reducing sugar, 57 percent of crude protein and 17.4 percent of ash, were prepared.

This product was less hygroscopic than that prepared in Example 1, and even by allowing it to stand for two weeks at 75 percent of humidity and at a temperature of 20° C., the moisture content of the product remained at 12.1 percent.

EXAMPLE 3

Ten liters of light steep liquor containing 10 percent of solid substances (100 g. of which contained 21 g. of lactic acid and 5.5 g. of reducing sugar), were sterilized and inoculated with 200 ml. of seed-culture of Aspergillus oryzae, and the mold was cultured at 33° C. under aeration and agitation while the PH of the medium was maintained at 4, for 48 hours. The cultured broth thus obtained was filtrated, and the multiplied cells of the microorganism were removed from the broth, and the filtrate was concentrated in vacuo to about 2 liters and thereafter mixed again with the above cells of microorganism. The resulting slurry was dried by an air-current wherein temperature of the charged air at the inlet was kept at 250° C. and that of the discharged air at the outlet at 70° C. Thereby, 950 g. of a pulverized product containing 10.2 percent of moisture, 5.1 percent of lactic acid, 1.5 percent of reducing sugar, 50 percent of crude protein and 16.3 percent of ash, were prepared.

Even by allowing this product to stand at a humidity of 75 percent and a temperature of 20° C. for two weeks, the moisture content of the product remained at 13.4 percent, and it showed no more marked increase of moisture content thereafter, but the favorable powdery condition was maintained.

EXAMPLE 4

Ten liters of light steep liquor containing 8 percent of solid substances (100 g. of which contained 22 g. of lactic acid and 5.3 g. of reducing sugar), were placed in the Jar fermenter and without being sterilized, this liquor was inoculated with 200 ml. of seed-culture of Saccharomyces cerevixiae, and the yeast was cultured for 14 hours at 30° C. while aerating with 7.5 liters of a air per minute and agitating with 300 r.p.m. of stirrer. The cultured broth so obtained was concentrated in vacuo to a liquid containing about 50 percent of solid substances, and subsequently the concentrate was dried by spray drying, with the air temperature at the inlet kept at 120° C., and that at the outlet at 70° C. In this manner, 700 g. of pulverized product containing 4.1 percent of moisture, 0.4 percent of lactic acid, 5.5 percent of reducing sugar, 57.1 percent of crude protein and 17.6 percent of ash, were prepared.

By allowing this product to stand for a week wherein at a humidity of 75 – 80 percent and a temperature of 20° C., the moisture content of the product rose to 15.2 percent, however it did not shown any marked increase of the moisture content thereafter, but the favorable powdery condition was maintained. The feed effectiveness of the pulverized product for chicks and eels was of the highest order, the same as in Example 1.

EXAMPLE 5

Ten liters of light steep liquor containing 8 percent of solid substances (100 g. of which contained 22 g. of lactic acid and 5.3 g. of reducing sugar), were placed in the Jar fermenter and without being sterilized, this liquor was inoculated with 200 ml. of seed-culture of Mycotorula japonica, the yeast was cultured under the same conditions as those given in Example 4. The cultured broth obtained was filtered and the multiplied cells of the microorganism were once removed. The filtrate was concentrated in vacuo to a liquid containing about 50 percent of solid substances, and the concentrate was mixed again with the above cells of the microorganism. The resulting slurry was spray-dried in the same way as described in Example 4, and thereby, 650 g. of pulverized product containing 15.5 percent of equilibrated moisture were prepared.

EXAMPLE 6

Light steep liquor containing 7 percent of solid substances (100 g. of which contained 20 g. of lactic acid and 4.5 g. of reducing sugar), was inoculated with seed-culture of Aerobacter aerogenes, and the bacterium was cultured at 37°

C. under aeration and agitation for 16 hours while the PH was maintained at about 6. The cultured broth obtained was concentrated and spray-dried in the same manner as in Example 4. The pulverized product so obtained was less hygroscopic and its feed effectiveness for chicks and eels was excellent.

EXAMPLE 7

Light steep liquor containing 7 percent of solid substances (100 g. of which contained 20 g. of lactic acid and 4.5 g. of reducing sugar), was inoculated with seed-culture of Hansenula anomala, and culturing of the yeast, concentrating and drying of the cultured broth were carried out in the same manner as in Example 5. Thereby, the less hygroscopic pulverized product was prepared.

EXAMPLE 8

Light steep liquor containing 7 percent of solid substances (100 g. of which contained 20 g. of lactic acid and 4.5 g. of reducing sugar), was inoculated with Endomycopsis vernalis, and culturing of the microorganism, concentrating and drying of the cultured broth were carried out in the same way as in Example 4. Thereby, the less hygroscopic pulverized product was prepared.

What we claim is:

1. A process for preparing a pulverized non-hygroscopic feed for animals, which comprises culturing, under aerobic conditions, in lactic acid containing unmodified light steep liquor of corn, non-pathogenic microorganisms having the property of metabolizing lactic acid until the lactic acid content of the light steep liquor is reduced to less than one-fourth of the initial content, and concentrating and drying the resulting cultured broth to obtain said pulverized feed.

2. The process according to claim 1, wherein the non-pathogenic microorganism is at least one member selected from the group consisting of yeasts belonging to the Genus *Endomycopsis, Hansenula, Saccharomyces, Candida, Mycotorula, Torulopsis, Mycoderma*; molds belonging to the Genus *Aspergillus, Penicillium, Rhizopus, Mucor*; and bacteria belonging to the Genus *Escherichia, Aerobacter, Bacillus, Pseudomonas, Sarcina* and *Acetobacter*.

3. The process according to claim 1, wherein the concentration of the solid substances in the light steep liquor is adjusted to 5 – 10 percent and the microorganisms are cultured in this medium as it is or after having adjusted the PH, but without addition of any other nutritive substances.

4. The process according to claim 1, wherein the light steep liquor is used as culturing medium of the microorganisms in unsterilized condition.

5. The process according to claim 4, wherein the culturing of the microorganisms is carried out or in an open fermenter.

6. The process according to claim 1, wherein the culturing of the microorganisms is carried out in the form of a continuous cultivation.

7. The process according to claim 1, wherein the concentrated broth is dried and pulverized by drum drying, spray drying or flask drying.

8. The process according to claim 1, wherein the cells of the microorganisms are separated from the cultured broth, and the filtrate is concentrated to a liquid containing 30–60 percent of solid substance, and the concentrate is mixed again with the previously-separated cells of the microorganisms and finally dried.

9. The process according to claim 1, wherein the cultured broth is concentrated, as is, to a liquid containing 30–60 percent of solid substance and is finally dried.

10. The process according to claim 1, wherein the moisture content of the pulverized product is less than 10 percent.

* * * * *